(12) United States Patent
Miyazaki

(10) Patent No.: US 11,833,441 B2
(45) Date of Patent: Dec. 5, 2023

(54) ROBOT

(71) Applicant: SONY INTERACTIVE ENTERTAINMENT INC., Tokyo (JP)

(72) Inventor: Yoshio Miyazaki, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 276 days.

(21) Appl. No.: 17/424,033

(22) PCT Filed: Jan. 25, 2019

(86) PCT No.: PCT/JP2019/002418
§ 371 (c)(1),
(2) Date: Jul. 19, 2021

(87) PCT Pub. No.: WO2020/152838
PCT Pub. Date: Jul. 30, 2020

(65) Prior Publication Data
US 2022/0096944 A1 Mar. 31, 2022

(51) Int. Cl.
*A63H 3/16* (2006.01)
*A63H 11/20* (2006.01)
*A63H 30/04* (2006.01)

(52) U.S. Cl.
CPC .............. *A63H 3/16* (2013.01); *A63H 11/20* (2013.01); *A63H 30/04* (2013.01)

(58) Field of Classification Search
CPC .......... A63H 3/16; A63H 11/18; A63H 11/20; A63H 30/04; A63H 33/042
USPC ....... 446/90, 91, 97, 99, 298, 338, 352, 356, 446/377
See application file for complete search history.

(56) References Cited

U.S. PATENT DOCUMENTS

| | | | |
|---|---|---|---|
| 6,290,565 B1 * | 9/2001 | Galyean, III | A63H 3/16 446/99 |
| 7,384,325 B2 * | 6/2008 | Kelly | A63H 3/36 446/268 |
| 9,526,979 B2 * | 12/2016 | Scott | A63F 13/00 |
| 9,555,326 B2 * | 1/2017 | Scott | A63F 13/245 |
| 9,737,808 B2 * | 8/2017 | Andre | A63F 13/45 |
| 9,901,827 B2 * | 2/2018 | May | A63H 33/042 |

(Continued)

FOREIGN PATENT DOCUMENTS

| | | |
|---|---|---|
| JP | 11-156765 A | 6/1999 |
| JP | 2001-347476 A | 12/2001 |
| JP | 2003-233502 A | 8/2003 |

OTHER PUBLICATIONS

International Preliminary Report on Patentability dated Aug. 5, 2021, from PCT/JP2019/002418, 19 sheets.

(Continued)

*Primary Examiner* — Joseph B Baldori
(74) *Attorney, Agent, or Firm* — XSENSUS LLP

(57) ABSTRACT

A robot 1 includes a primary part and a plurality of sub-parts, and the sub-parts are each configured to be attached to and detached from the primary part. The primary part includes an information processing section 11 that acquires part identification information used for identifying the plurality of sub-parts, and a drive processing section 21 that controls a movement of at least one of the sub-parts in a manner of control associated with the part identification information acquired by the information processing section 11.

14 Claims, 4 Drawing Sheets

(56) References Cited

U.S. PATENT DOCUMENTS

| | | | |
|---|---|---|---|
| 10,549,207 B2* | 2/2020 | Kroyan | B25J 9/1697 |
| 10,610,792 B2* | 4/2020 | Adekunle | A63H 33/042 |
| 11,369,864 B2* | 6/2022 | Zuniga | A63H 3/003 |
| 2013/0109267 A1* | 5/2013 | Schweikardt | A63H 33/042 |
| | | | 446/85 |
| 2014/0030955 A1* | 1/2014 | Smetanin | A63H 3/36 |
| | | | 446/268 |
| 2015/0258435 A1 | 9/2015 | Zhang et al. | |
| 2016/0151909 A1 | 6/2016 | Hardouin et al. | |
| 2018/0370025 A1* | 12/2018 | Didey | B25J 9/102 |
| 2019/0176049 A1* | 6/2019 | Isozu | A63H 33/22 |

OTHER PUBLICATIONS

International Search Report and Written Opinion dated Apr. 16, 2019, from PCT/JP2019/002418, 22 sheets.

* cited by examiner

ROBOT

TECHNICAL FIELD

The present invention relates to a robot and particularly to a robot built by combining a plurality of parts.

BACKGROUND ART

PTL 1 discloses a legged locomotion robot that selects an appropriate leg section on the basis of a road surface condition, a walking status, and the like, autonomously replaces the leg section, and determines a walking motion pattern suitable under conditions defined according to the replaced leg section.

CITATION LIST

Patent Literature

[PTL 1]
JP 2001-347476A

SUMMARY

Technical Problem

Robot functions are evolving day by day. While quadruped walking pet robots are the mainstay of a commercial model, humanoid robots capable of making a variety of motions such as dancing have been in circulation in recent years. Since deep learning is put into practice as a result of the enhanced processing capability of computers and improved learning models, robots are expected to implement improvement in their existing functions and acquisition of new functions through learning, by incorporating AI (Artificial Intelligence) into the robots.

Although selling prices of home robots are dropping, such robots are not inexpensive enough for one user to purchase two or more units. Accordingly, it is common for one user to own a single robot. As a result, as time passes, the user gains approximate knowledge regarding an autonomous behavior pattern of the robot, thus resulting in a worn-off novelty. The present disclosing party has conceived a mechanism to enhance an entertaining nature of robots such that users can enjoy the interaction with the robots.

The present invention has been devised in light of the foregoing problem, and it is an object of the present invention to provide a technique for enhancing an entertaining nature of robots.

Solution to Problem

In order to solve the above problem, a robot according to a mode of the present invention includes a primary part and a plurality of sub-parts, and the sub-parts are each configured to be attached to and detached from the primary part. The primary part includes an information processing section that acquires part identification information used for identifying the plurality of sub-parts, and a drive processing section that controls a movement of at least one of the sub-parts in a manner of control associated with the part identification information acquired by the information processing section.

It should be noted that any combination of the above constituent elements and conversions of expressions of the present invention between a method, an apparatus, a system, a computer program, a recording medium having a computer program recorded therein in a readable manner, a data structure, and so on are also effective as modes of the present invention.

DESCRIPTION OF EMBODIMENT

Figure 1:
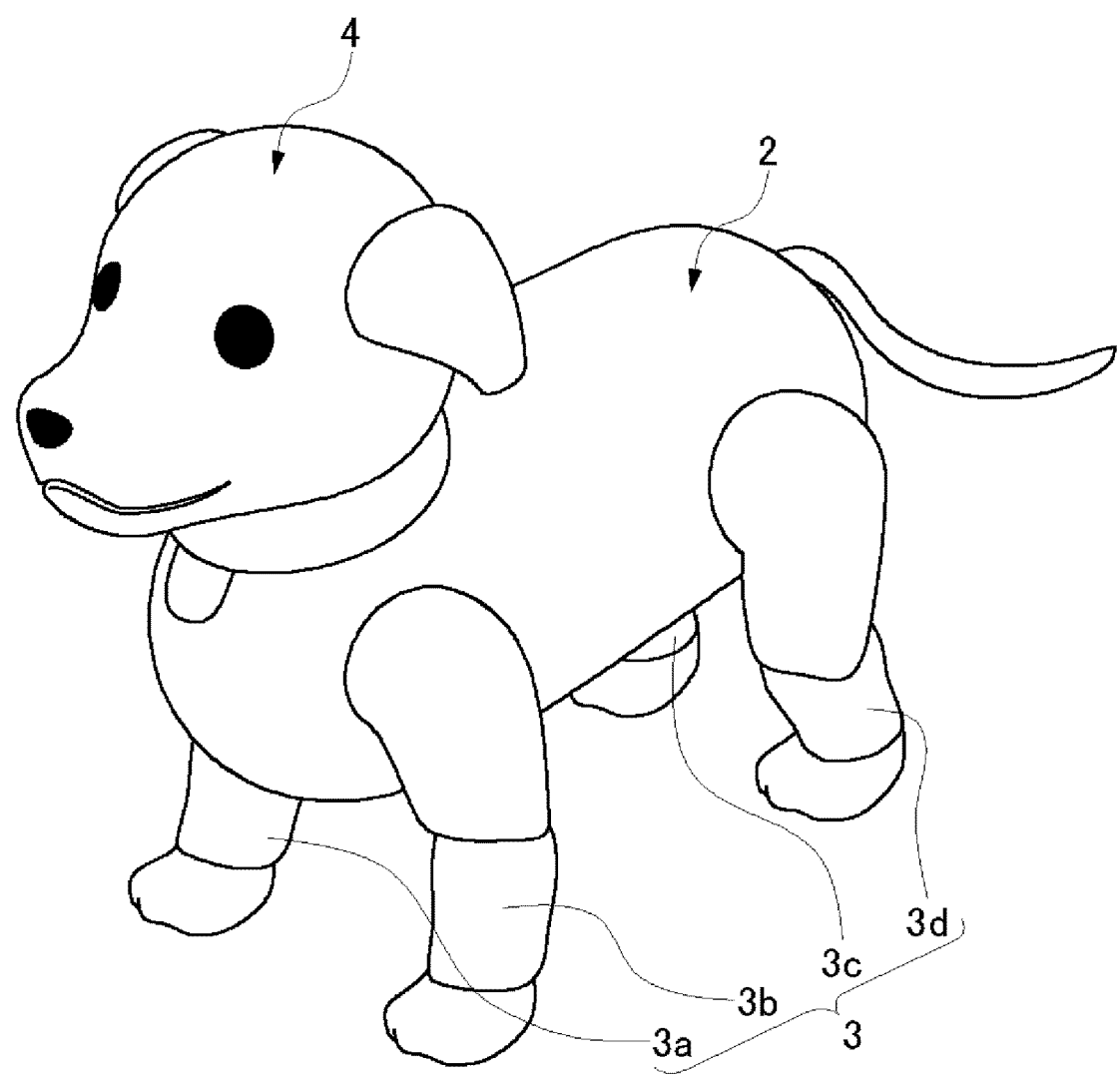
FIG. 1 is a diagram illustrating an appearance and configuration of a robot of an embodiment.

FIG. 1 illustrates an appearance and configuration of a robot of an embodiment. A robot 1 is a pet robot and has an autonomous behavior function. The robot 1 is built by assembling a plurality of parts together and has an appearance that resembles a puppy in the example illustrated in FIG. 1.

The robot 1 of the embodiment includes a primary part and a plurality of sub-parts, and the sub-parts are configured to be attached to and detached from the primary part. The robot 1 is built when a user attaches the sub-parts to the primary part. The primary part and the sub-parts each incorporate a circuit board including electronic components, an actuator, a sensor, and the like, and it is preferred that, when a sub-part is attached to or detached from the primary part, the attachment or detachment of the sub-part be possible in a hot-line state without turning off the power. In the embodiment, the primary part is a torso part 2 that incorporates a processor that controls motions of the robot 1 with sub-parts attached thereto. The sub-parts are parts included in the respective parts of the robot 1 and include leg parts 3 that realize a locomotive function of the robot 1 and a head part 4 that forms a head of the robot 1.

The robot 1 has four leg parts 3, that is, a right front leg 3a, a left front leg 3b, a right rear leg 3c, and a left rear leg 3d, and each of the leg parts 3 is rotatably connected to the torso part 2. Each of the leg parts 3 may have a quad axial or more degree of freedom to realize a movement similar to that of a dog. The head part 4 is rotatably connected to the torso part 2 in a neck portion. The torso part 2, the leg parts 3, and the head part 4 have actuators and sensors to realize a mobility function of the robot 1, such as walking. The actuator has at least motors provided in a joint portion and a link mechanism that connects the motors.

The user can build the desired robot 1 by connecting the sub-parts to the torso part 2. The user may own a plurality of types of head parts 4 and a plurality of types of leg parts 3 and replace them freely on the torso part 2. For example, the user first purchases the dog-shaped robot illustrated in FIG. 1 and then purchases sub-parts sold as options. The sub-parts sold as options include, for example, a head part in a shape resembling cat's head and neck portions, a head part in a shape resembling giraffe's head and neck portions, and a leg part in a shape resembling a horse's leg portion. Not only sub-parts of real animals but also sub-parts of imaginary animals may be sold. The user can build his or her original robot 1 by attaching various sub-parts to the torso part 2 as the primary part.

The robot 1 can acquire a basic mobility function through learning. For example, the robot 1 acquires a mobility function of "walking" through learning by actually activating the actuators. Learning results obtained when the robot becomes able to walk properly are stored as a drive parameter indicating a manner of control over various types of actuators. The drive parameter defines, in order of time, state changes of all actuators that handle the mobility function, and after the drive parameter is acquired, it is not necessary to conduct learning under the same condition. After the learning, the robot 1 can perform a stable walking motion by driving each actuator through regulation of an amount of electric power supplied to each actuator from the drive parameter. It should be noted that the robot 1 will be able to not only walk but also jump, stand on hind legs, and perform other mobility functions through learning.

Figure 2:
FIG. 2 is a diagram illustrating an appearance and configuration of the robot whose head part has been replaced.

FIG. 2 illustrates the robot 1 whose dog head part 4 has been replaced with a giraffe's head part 4a. In the example illustrated in FIG. 2, the user has replaced only the head part, but the leg parts are not replaced. The giraffe's head part 4a is taller than the dog head part 4, causing a center of gravity of the robot 1 for a stable posture to change. Accordingly, the robot 1 cannot use the drive parameter acquired through the learning as a dog robot illustrated in FIG. 1 and needs to control each actuator by using another drive parameter. At this time, if the results obtained through the learning with the giraffe's head part 4a attached do not exist, the robot 1 needs to acquire a new drive parameter by learning the mobility function with the giraffe's head part 4a and the leg parts 3 attached.

Figure 3:
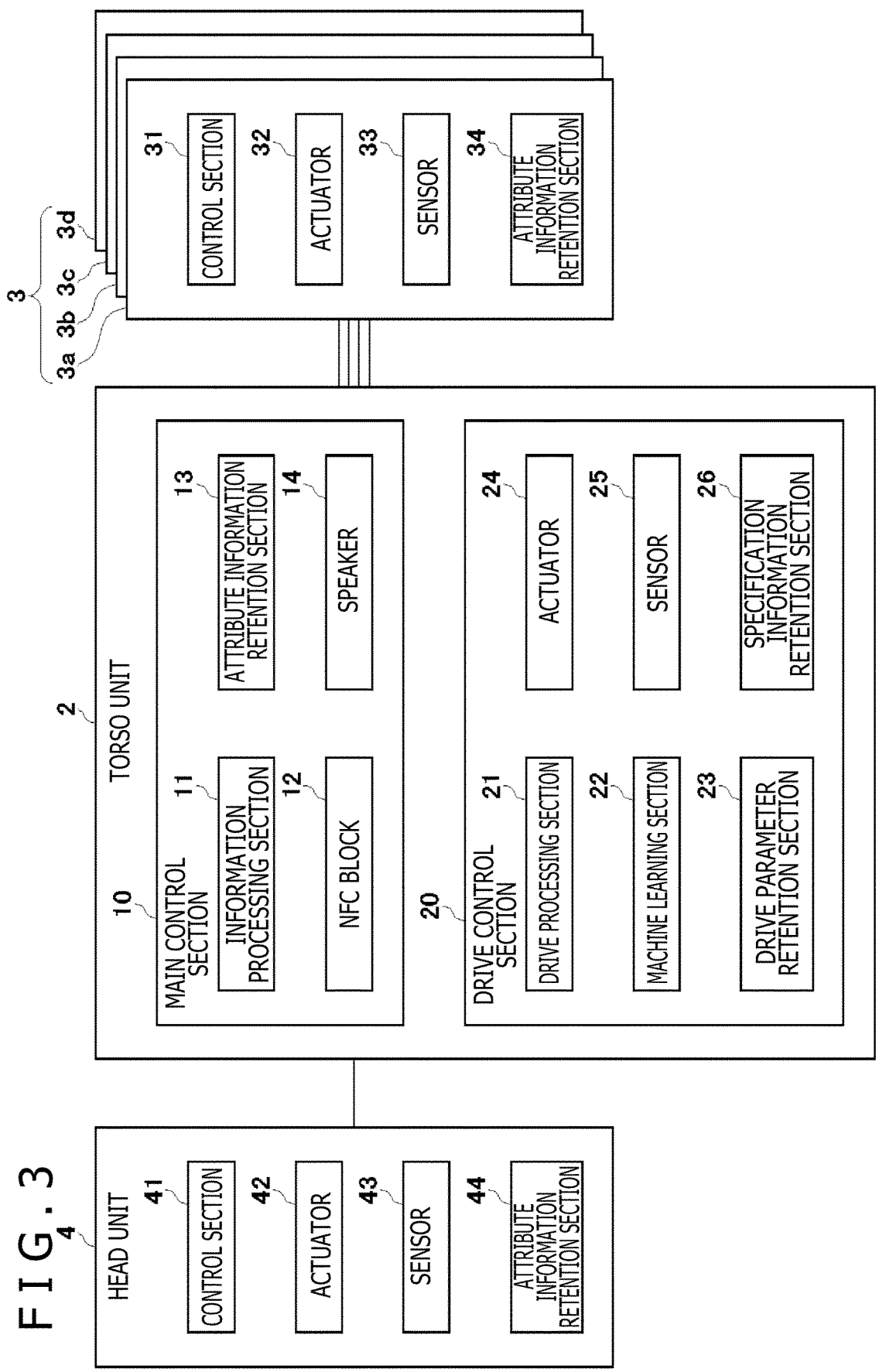
FIG. 3 is a diagram illustrating functional blocks of the robot.

FIG. 3 illustrates functional blocks of the robot 1. The torso part 2, which is the primary part, and the leg parts 3 and the head part 4, which are the sub-parts, are connected such that signals are exchanged through wired or wireless communication. It should be noted that it is preferred that the torso part 2, the leg parts 3, and the head part 4 be connected such that they can be attached and detached in a hot-line state.

The torso part 2 includes a main control section 10 and a drive control section 20. The main control section 10 has an information processing section 11, an NFC block 12, an attribute information retention section 13, and a speaker 14. The drive control section 20 has a drive processing section 21, a machine learning section 22, a drive parameter retention section 23, an actuator 24, a sensor 25, and a specification information retention section 26. The attribute information retention section 13 includes information used for identifying the torso part 2, specifically, a manufacturer ID (Identification), a component ID, a model number, and a serial number of the torso part 2. Here, the component ID is information that identifies the torso part. The sensor 25 is used to detect the movement of the torso part 2 and includes a rotation angle sensor and a motion sensor.

The right front leg 3a, which is one of the leg parts 3, includes a control section 31, an actuator 32, a sensor 33, and an attribute information retention section 34. The other leg parts 3, that is, the left front leg 3b, the right rear leg 3c, and the left rear leg 3d, each similarly include the control section 31, the actuator 32, the sensor 33, and the attribute information retention section 34. The attribute information retention section 34 includes information used for identifying the leg part 3, specifically, a manufacturer ID, a component ID, a model number, and a serial number of the leg part 3. The component ID is information that identifies which one of the leg parts, that is, the right front leg, the left front leg, the right rear leg, and the left rear leg, is used. The sensor 33 is used to detect the movement of the leg part 3 and includes a rotation angle sensor and a motion sensor. The sensor 33 may include a sensor that detects the attachment to and detachment from the torso part 2.

The head part 4 includes a control section 41, an actuator 42, a sensor 43, and an attribute information retention section 44. The attribute information retention section 44 includes information used for identifying the head part 4, specifically, a manufacturer ID, a component ID, a model number, and a serial number of the head part 4. The component ID is information that identifies the head part. The sensor 43 is used to detect the movement of the head part 4 and includes a rotation angle sensor and a motion sensor. The sensor 43 may include a sensor that detects the attachment to and detachment from the torso part 2.

The main control section 10 and the drive control section 20 of the torso part 2, the control sections 31 of the leg parts 3, and the control section 41 of the head part 4 can be configured with integrated circuit blocks, memories, and other LSI (Large Scale Integration) in terms of hardware and can be realized by programs loaded into the memories or the like in terms of software. Accordingly, it is to be understood by those skilled in the art that these functional blocks can be realized in various ways by hardware alone, software alone, or a combination thereof, and the functional blocks are not limited to any one of them. While the main control section 10 and the drive control section 20 include CPUs (Central Processing Units) provided on separate circuit boards in the embodiment, these sections may be configured on the same circuit board in another example. In the main control section 10, the information processing section 11 acquires part identification information from each attached part. When the right front leg 3a, the left front leg 3b, the right rear leg 3c, and the left rear leg 3d, which are the leg parts 3, are attached to the torso part 2, each of the control sections 31 reads out part identification information from the attribute information retention section 34 and sends the information to the information processing section 11. In a similar manner, when the head part 4 is attached to the torso part 2, the control section 41 reads out part identification information from the attribute information retention section 44 and sends the information to the information processing section 11. The information processing section 11 supplies the acquired part identification information to the drive control section 20.

It is preferred that, when a sub-part is attached to the torso part 2, the information processing section 11 immediately acquire part identification information from the attached sub-part. For example, when the sensor 33 or 44 in each sub-part detects the attachment of the sub-part to the torso part 2, the control section 31 or 41 may send part identification information to the information processing section 11. The sensor 33 or 43 may detect the attachment of the sub-part to the torso part 2 when the sensor 33 or 43 becomes possible to communicate with the torso part 2. Also, the information processing section 11 may regularly send an inquiry about part identification information to each sub-part, and the control section 31 or 41 of the sub-part may return the part identification information to the information processing section 11. As described above, the information processing section 11 acquires part identification information of the plurality of sub-parts connected to the torso part 2 and notifies the drive control section 20 of the information. This allows the drive control section 20 to grasp which sub-parts are connected to the torso part 2.

The drive processing section 21 controls the movements of the torso part 2, the leg parts 3, and the head part 4 by driving the actuator 24, the actuators 32 of the leg parts 3, and the actuator 42 of the head part 4. When part identification information of each sub-part is notified, the drive processing section 21 checks whether the drive parameter retention section 23 retains a drive parameter in association with the combination of a plurality of pieces of notified part identification information of sub-parts.

The drive parameter retention section 23 retains a drive parameter used for controlling the movement of each sub-part, in association with the combination of a plurality of pieces of part identification information. The drive parameter defines, in order of time, state changes of all the actuators involved in the mobility function. Specifically, the drive parameter may be a parameter which defines an amount of state change of each actuator (motor) according to the time lapse or a parameter which allows calculation of an appropriate amount of state change of each actuator on a real time basis. The drive parameter may be acquired in association with a combination of a plurality of sub-parts when the machine learning section 22 learns the mobility function.

The specification information retention section 26 retains specification information regarding a drive mechanism, for each piece of part identification information. Specification information is acquired from an external server, a USB (Universal Serial Bus) memory, or the like and stored in the specification information retention section 26. Specification information includes a structure, a type, and a layout of the actuator provided in the part and a motion range of each joint. The machine learning section 22 learns the mobility function by regulating drive currents of motors with the drive processing section 21, the control section 31, and the control section 41 on the basis of specification information. The machine learning section 22 may learn the mobility function by using any type of learning algorithm.

The machine learning section 22 may, for example, start the learning of a basic mobility function such as walking when the user selects a "learning mode" as a motion mode of the robot 1. A termination condition may be set for learning, and the learning of the "walking" motion, for example, may be terminated when the robot 1 becomes capable of walking a predetermined distance within a predetermined period of time.

When the sub-parts illustrated in FIG. 1, i.e., the puppy's leg parts 3 and head part 4, are attached to the torso part 2, in the case where a mobility function has yet to be learned, the machine learning section 22 learns the mobility function and stores the drive parameter acquired as a result of the learning, in the drive parameter retention section 23 in association with the combination of pieces of part identification information of the leg parts 3 and the head part 4. This allows the drive parameter retention section 23 to retain the drive parameter for the robot 1 in the shape of a puppy in association with the combination of identification information of the leg parts 3 and identification information of the head part 4. At this time, part identification information of the torso part 2 may be added as a part of the combination.

When the sub-parts illustrated in FIG. 2, i.e., the puppy's leg parts 3 and the giraffe's head part 4a, are attached to the torso part 2, in the case where a mobility function has yet to be learned, the machine learning section 22 learns the mobility function and stores the drive parameter acquired as a result of the learning, in the drive parameter retention section 23 in association with the combination of pieces of part identification information of the leg parts 3 and the head part 4a. At this time, part identification information of the torso part 2 may be added as a part of the combination. This allows the drive parameter retention section 23 to retain the drive parameter of the robot 1 having the giraffe's head and the puppy's legs.

When part identification information of each connected sub-part is notified, the drive processing section 21 checks whether the drive parameter retention section 23 retains a drive parameter in association with the combination of a plurality of pieces of notified part identification information of sub-parts. In the case where the drive parameter is retained, the drive processing section 21 reads out the corresponding drive parameter from the drive parameter retention section 23 and drives at least one of the actuators 24, 32, and 42. As described above, even in the case where the sub-parts have been replaced, the drive processing section 21 can suitably move the robot 1 by controlling the movement of at least one of the sub-parts in a manner of control associated with part identification information of the sub-part.

If no drive parameter is retained in the drive parameter retention section 23 in association with the combination of a plurality of pieces of part identification information notified from the information processing section 11, the machine learning section 22 may automatically start the learning of the mobility function. Alternatively, as described above, the learning of the mobility function may be started when the user selects the "learning mode." It should be noted that, in the case where the drive control section 20 has no machine learning function, the information processing section 11 may acquire, from an external server, a drive parameter associated with the combination of a plurality of pieces of notified part identification information. At this time, the information processing section 11 reads out part identification information from the attribute information retention section 13, notifies the external server of a combination of part identification information of the torso part 2 and part identification information of the sub-parts, and acquires, from the external server, a drive parameter associated with the combination of pieces of part identification information.

While the drive processing section 21 exercises control, each part sends sensor detection information (sensor information) to the information processing section 11. In the leg parts 3, the control sections 31 send sensor information to the information processing section 11, and in the head part 4, the control section 41 sends sensor information to the information processing section 11. Sensor information may include rotational angles of motors of actuators 32 and 42 or a motion sensor value. The information processing section 11 transfers received sensor information to the drive processing section 21. The drive processing section 21 exercises, by taking into consideration sensor information of the sensor 25 as well, feedback control such that a behavior of the robot 1 follows a behavior defined by the drive parameter of the robot 1.

Figure 4:
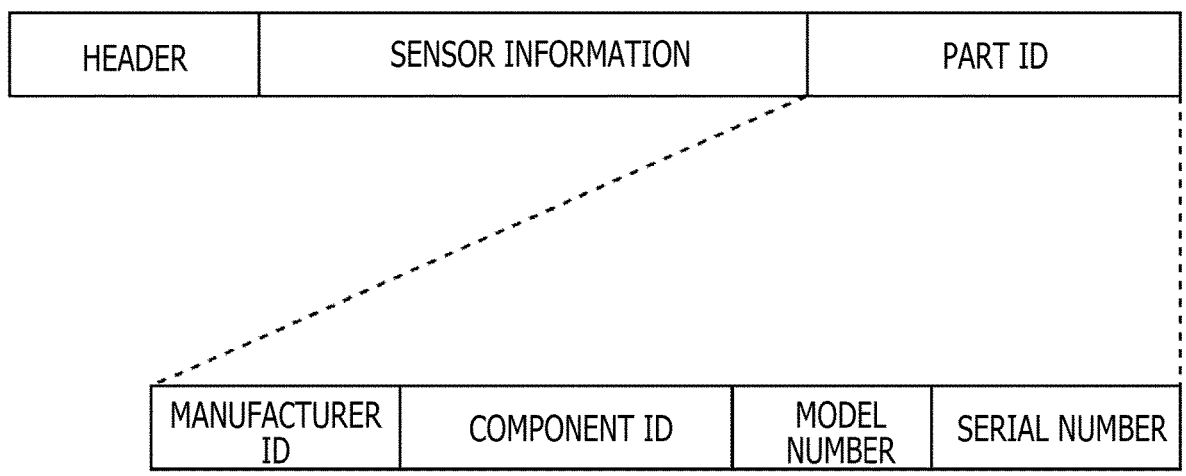
FIG. 4 is a diagram illustrating a data format of sensor information.

FIG. 4 illustrates a data format of sensor information sent from sub-parts. The data format includes a header, sensor information, and a part ID (part identification information). The part ID includes at least a manufacturer ID, a component ID, a model number, and a serial number. The information processing section 11 transfers received sensor information to the drive processing section 21.

The drive processing section 21 can identify the sender of sensor information from the part ID by acquiring the sensor information in the data format illustrated in FIG. 4. This allows the drive processing section 21 to exercise feedback control in an appropriate manner. In particular, in the case where the robot 1 provides a mechanism that allows the attachment and detachment of the sub-parts in a hot-line state without turning off the power, when a part ID is sent together with sensor information, the drive processing section 21 can recognize, from the part ID accompanying the sensor information, that there has been a change in the sub-parts, thus allowing swift switching over to a corresponding manner of control.

The present invention has been described above on the basis of the embodiment. It is to be understood by those skilled in the art that the embodiment is illustrative, that a combination of constituent elements and processes in the embodiment is variously modified, and that such modifications also fall within the scope of the present invention. While the case where the robot 1 is a pet robot is described in the embodiment, the robot 1 may be a humanoid robot.

In the embodiment, given is a description of control exercised by the drive processing section 21 over the movements of the sub-parts in a manner of control corresponding to the attached sub-parts. That is, in the embodiment, the drive processing section 21 makes appropriate movements of the robot 1 possible by determining the drive parameter of the mobility function according to the sub-part. In a modification example, as sub-parts are replaced, the information processing section 11 changes a state parameter value that defines a character or other features of the robot 1.

For example, the information processing section 11 may set a different state parameter value for the character or other features of the robot 1, for example, in each of the cases, that is, the case where the puppy's head part 4 is attached and the case where the giraffe's head part 4a is attached. The information processing section 11 has a function to detect surrounding conditions from information input from a camera, a microphone (not depicted), or the like and notify the drive processing section 21 of the detected conditions. In the modification example, the drive processing section 21 may be notified of not only the detected conditions but also the changed parameter value.

The drive processing section 21 has a function to determine an autonomous behavior of the robot 1 according to the notified surrounding conditions and activate the robot 1. In the modification example, the drive processing section 21 may further determine the autonomous behavior of the robot 1 according to the notified state parameter value. The information processing section 11 sets a parameter value representing an obedient character when the puppy's head part 4 is attached. On the other hand, the information processing section 11 sets a parameter value representing an aggressive character when the giraffe's head part 4a is attached. When a parameter value representing an obedient character is notified, the drive processing section 21 may cause the robot 1 to take on an obedient autonomous behavior such as snuggling up to the user, and when a parameter value representing an aggressive character is notified, the drive processing section 21 may cause the robot 1 to take on an aggressive autonomous behavior such as bumping into the user. Also, in the case where the robot 1 can speak human words from the speaker 14, the information processing section 11 may change a voice tone according to the parameter value representing the character.

As described above, the user can encounter the new robot 1 by replacing the sub-parts, thus enhancing the entertaining nature of the robot 1. Also, while two types of sub-parts, that is, the leg parts 3 and the head part 4, are used in the embodiment, further fragmented sub-parts may be made available. Also, while the torso part 2 is used as a primary part in the embodiment, the leg parts 3 or the head part 4 may be used as primary parts.

It should be noted that the user may change an appearance of the robot 1 by changing an exterior thereof or dressing the robot 1. At this time, an NFC (Near Field Communication) tag is provided on an exterior material or clothing, and the NFC block 12 which is a short-range wireless communication reader module acquires part identification information from the NFC tag and supplies the information to the information processing section 11. When part identification information is acquired, the information processing section 11 may read out specification information from the specification information retention section 26, identify sub-part specification, and, for example, update the state parameter value.

REFERENCE SIGNS LIST

1: Robot
2: Torso part
3: Leg part
4, 4a: Head part
10: Main control section
11: Information processing section
12: NFC block
13: Attribute information retention section
14: Speaker
20: Drive control section
21: Drive processing section
22: Machine learning section
23: Drive parameter retention section
24: Actuator
25: Sensor
26: Specification information retention section
31: Control section
32: Actuator
33: Sensor
34: Attribute information retention section
41: Control section
42: Actuator
43: Sensor
44: Attribute information retention section

INDUSTRIAL APPLICABILITY

The present invention is applicable to a robot field.

The invention claimed is:
1. A robot comprising:
a primary part;
a plurality of sub-parts, wherein
the sub-parts are each configured to be attached to and detached from the primary part, and
the primary part includes
information processing circuitry configured to acquire part identification information used for identifying the plurality of sub-parts, and
drive processing circuitry configured to control a movement of at least one of the sub-parts in a manner of control associated with the part identification information acquired by the information processing circuitry; and
a memory configured to retain a drive parameter used for controlling the movement of the sub-part, in association with a combination of a plurality of pieces of part identification information, wherein,
in response to the drive parameter associated with the combination of the plurality of pieces of part identification information being available, the drive processing circuitry reads out the drive parameter retained in association with the combination of the plurality of pieces of part identification information, from the memory, and controls the movement of the sub-part, and in response to no drive parameter being associated with the combination of the plurality of pieces of part identification information, the drive processing circuitry automatically starts learning a mobility function for the combination of the plurality of pieces of part identification information.

2. The robot according to claim 1, wherein the sub-part includes a leg part that realizes a mobility function of the robot.

3. The robot according to claim 1, wherein the sub-part includes a head part forming a head of the robot.

4. The robot according to claim 1, wherein the primary part is configured as a torso part.

5. The robot according to claim 1, wherein the sub-part sends sensor detection information together with the part identification information.

6. The robot according to claim 1, wherein the drive processing circuitry stops learning the mobility function in response to a termination condition.

7. The robot according to claim 6, wherein the termination condition corresponds to the mobility function moving the robot a predetermined distance in a predetermined amount of time.

8. The robot according to claim 1, wherein the information processing circuitry is further configured to immediately acquire the part identification information in response to the sub-part being attached to the primary part.

9. The robot according to claim 8, wherein the information processing circuitry is further configured to periodically, while the sub-part is attached to the main part, send an inquiry regarding the part identification information.

10. The robot according to claim 1, wherein the drive parameter defines, in order of time, state changes of all actuators involved in the mobility function.

11. The robot according to claim 10, wherein the drive parameter defines an amount of a state change of each actuator according to a time lapse.

12. The robot according to claim 10, wherein the drive processing circuitry is further configured to calculate an appropriate amount of a state change of each actuator in real time based on the drive parameter.

13. The robot according to claim 1, wherein the primary part includes a second memory configured to store specific information, wherein the specific information includes a structure, a type, and a layout of an actuator provided in each sub-part and a motion range of each joint.

14. The robot according to claim 1, wherein the sub-parts are each configured to be attached to and detached from the primary part in a hot-line state without powering off the robot.

* * * * *